United States Patent

Sujita

[11] Patent Number: 5,764,864
[45] Date of Patent: Jun. 9, 1998

[54] FACSIMILE MACHINE HAVING A POWER SAVING FUNCTION

[75] Inventor: Kenji Sujita, Kanagawa, Japan

[73] Assignee: Ricoh Company, Ltd.

[21] Appl. No.: 661,142

[22] Filed: Jun. 10, 1996

[30] Foreign Application Priority Data

Jun. 9, 1995  [JP]  Japan ................... 7-168090

[51] Int. Cl.⁶ .................................................. H04N 1/32
[52] U.S. Cl. .......................... 395/113; 358/437; 358/442
[58] Field of Search .................................. 358/400, 437, 358/442, 468; 379/100, 93.36, 102.04; 395/113; 399/88–90; H04N 1/00, 1/32

[56] References Cited

U.S. PATENT DOCUMENTS

| | | | |
|---|---|---|---|
| 5,177,620 | 1/1993 | Fukushima | 358/404 |
| 5,325,209 | 6/1994 | Manabe | 358/437 |
| 5,475,500 | 12/1995 | Takeda | 358/434 |
| 5,590,339 | 12/1996 | Chang | 358/442 |
| 5,668,642 | 9/1997 | Yoshida | 358/442 |

FOREIGN PATENT DOCUMENTS

| | | |
|---|---|---|
| 1-114253 | 5/1989 | Japan. |
| 2-306754 | 12/1990 | Japan. |
| 5-260229 | 10/1993 | Japan. |

*Primary Examiner*—Kim Vu
*Attorney, Agent, or Firm*—Dickstein Shapiro Morin & Oshinsky LLP

[57] ABSTRACT

A facsimile machine is disclosed which can selectively set one of a plurality of receiving modes, such as a facsimile mode and a telephone mode, and is equipped with a power saving function. A facsimile machine equipped with a power saving function has a waiting state where only portions of the facsimile machine receive operating power and includes a receiving mode setting part for setting a message receiving mode, and a power saving control unit for determining whether or not a predetermined signal, associated with a set mode as a power saving reset signal is received and, if so, for resetting the power saving state, whereby power is supplied to the entirety of the facsimile machine. In a first preferred embodiment, the facsimile machine is controlled so that a calling signal is set as the power saving reset signal when a facsimile mode is set as the message receiving mode, and the power saving state is not reset with the calling signal when the telephone mode is set as the message receiving mode.

8 Claims, 5 Drawing Sheets

FACSIMILE MACHINE HAVING A POWER SAVING FUNCTION

BACKGROUND OF THE INVENTION

The present invention relates to a facsimile machine having a power saving function while in a waiting state. More particularly, the invention relates to a facsimile machine equipped with an improved power saving function when the machine is capable of being switched between a facsimile function and a telephone function.

A power saving function currently exists in both permanent and portable facsimile machines. In facsimile machines having a power saving feature, the amount of consumed electric power is reduced by supplying electric power only to the needed parts and circuits and cutting the electric power to other circuits, while the facsimile machine is in a waiting state in which no message is sent or received.

For example, in a facsimile machine disclosed in the Japanese Unexamined Patent Application No. HEI 5-260229, the power saving state is provided while in a waiting state, and the power saving state is turned off, or reset as used in this specification, by detecting a calling signal at the time of receiving a message, and a message sending command signal at the time of transmitting a message.

However, this facsimile machine has both a facsimile mode and a telephone mode. This creates a problem because when either the facsimile receiving mode or telephone receiving mode is selected, the power saving state is reset, i.e. turned off, upon receipt of an incoming call and electric power is supplied to some circuits which, when the machine is in a telephone mode, are unused. These unused circuits include an image forming device, which consumes a large amount of electric power.

When unnecessary power is frequently supplied, the aging of an exposure lamp and heating parts in the facsimile machine is accelerated which shortens the life of the whole machine.

SUMMARY OF THE INVENTION

The present invention solves the problem of the previously described conventional facsimile machine. Thus, an object of the invention is to provide a facsimile machine which can selectively set a plurality of receiving modes and is equipped with a power saving function which has the improved effect of saving electric power.

As a first means to attain the object of the invention, the present invention provides a facsimile machine equipped with a power saving function in a waiting state comprising: a message receiving mode setting part for setting a message receiving mode, e.g., a facsimile mode or a telephone mode, and a power saving control unit for determining whether a predetermined signal, e.g. a calling signal, is to be considered as a power saving reset signal in accordance with the kind of the receiving mode which is set by the message receiving mode setting part. If the power saving reset signal, e.g. a calling signal, which is associated with the set message receiving mode, e.g. the facsimile mode, is detected, the power saving function is reset and power is supplied to portions of the facsimile machine which do not receive power in the power saving state.

As a second means to attain the object of the invention, the power saving control unit is designed to determine that a calling signal is a power saving reset signal when the message receiving mode is set to facsimile mode, and that the calling signal is not a power saving reset signal when the message receiving mode is set to telephone mode.

In the present invention upon detecting a predetermined signal which is set as a power saving reset signal, the power saving state is reset only when resetting is needed by the receiving mode which has been set and a needless resetting of the power saving state is avoided.

With the invention, power is prevented from being supplied to components, such as an image forming device, which are not needed in a telephone mode by using the calling signal as a power saving signal only when the facsimile machine is in a facsimile mode and controlling the machine so that the power saving state is reset only when the calling signal is received while the machine is in a facsimile mode and not reset in the case where the telephone mode is set.

Preferred embodiments of the present invention will now be described in detail in connection with the accompanying drawings.

DETAILED DESCRIPTION OF A PREFERRED EMBODIMENT

Figure 1:
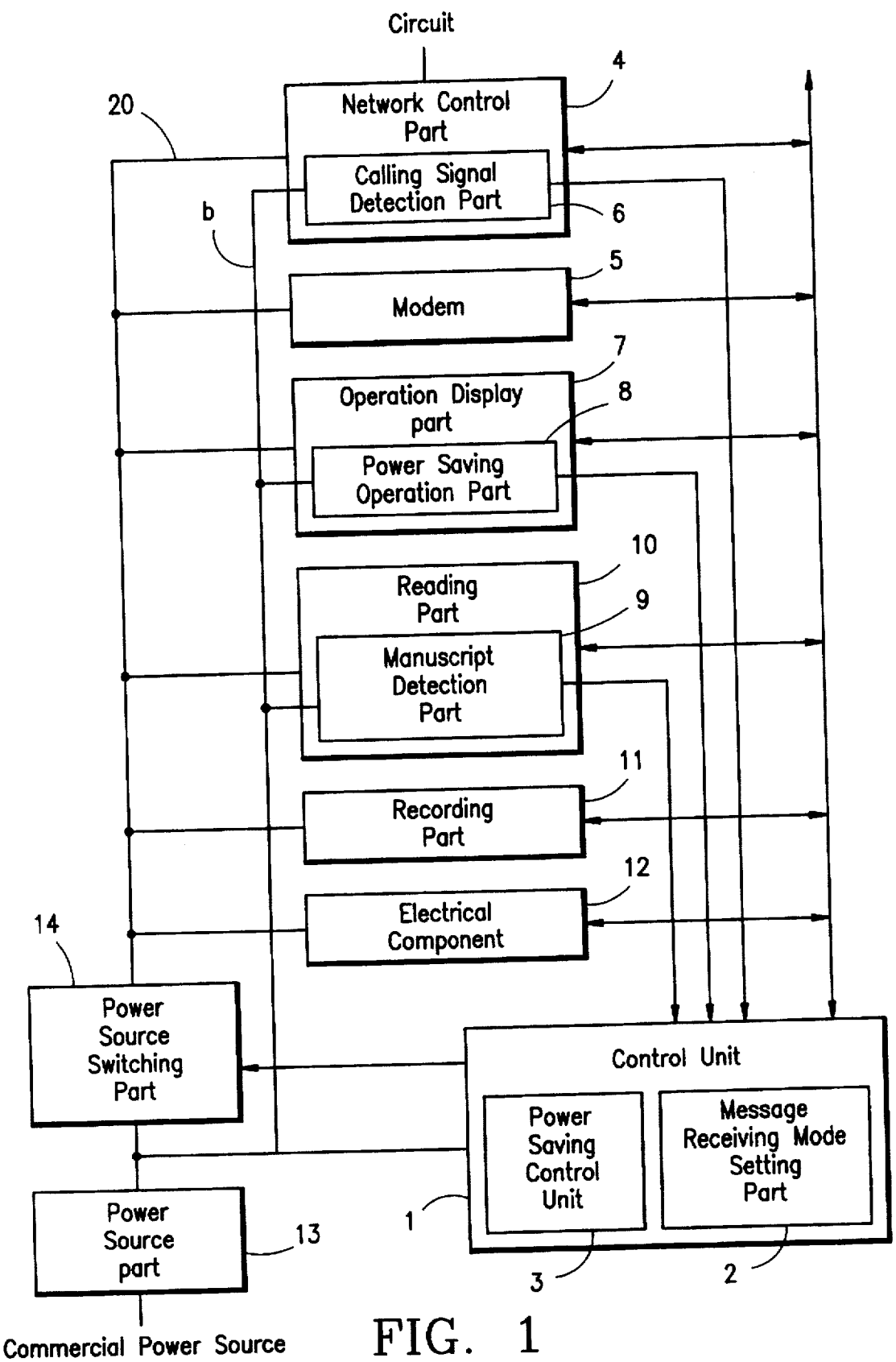
FIG. 1 is a block diagram of a facsimile machine equipped with a power saving function according to a first preferred embodiment of the present invention.

As shown in FIG. 1, the facsimile machine according to a first preferred embodiment of the present invention includes a control unit 1 for maintaining and controlling an entire facsimile machine in accordance with an incorporated program, an operation display part 7 which includes a keyboard which enables an operator to give an instruction to the facsimile machine and a display means for giving a message to the operator from the facsimile machine, a reading part 10 for reading an original image, a recording part 11 for recording the received image on facsimile paper, a network control part or unit (NCU) 4 for establishing a call with a remotely located facsimile machine via a public telephone network, an electrical component 12 including a communication control unit for sending and receiving a facsimile message in accordance with a G-3 transmission procedure and protocol and a coding and decoding part (DCR) for compressing and decompressing image data, a modem 5, a power source part 13, and a power source switching part 14. A memory for storing image information is also included in the control unit 1.

When the facsimile machine sends a facsimile message, image information such as a manuscript is read into the memory via the reading part 10 under the control of the control unit 1 and the image information is compressed by the DCR and is stored again in the memory. Also, information designated at the time of calling, such as an address designated by the keyboard within the operation display part 7, is obtained by the control unit 1, and the NCU 4 which has received the address information establishes a call with the designated address. Subsequently, the compressed image information data in the memory is modulated by the modem 6 and sent over the telephone lines via NCU 4.

When a message is received, after setting a call connection with NCU 4, a predetermined communication is performed via the modem 6, and compressed image data sent from another facsimile machine is received. The compressed image data is stored in the memory via NCU 4 and the communication control unit 1, and further, the image data is decompressed by the DCR and sent to the recording part 11 via the memory.

Further, the control unit 1 includes a message receiving mode setting part 2 for setting a message receiving mode and a power saving control unit 3 for determining whether a predetermined signal is a power saving reset signal. Whether a particular signal, such as a calling signal, will be regarded as a power saving reset signal will be determined by the message mode, which is previously set. The power saving control unit 3 causes the power switching part 14 to switch off power to a power line 20 when the control unit 1 is set in a waiting state in which message sending and receiving is not performed, and causes the power switching part 14 to supply power to the network control unit 4, the modem 6, the operation display part 7, the reading part 9, the recording part 11 and the electrical component 12 via the power line 20 when a power saving reset signal is received.

The input side of the power source part 13 is connected to a commercial power source, and in the waiting state the electric power is supplied only to the control unit 1, a calling signal detection part 5 in the NCU 4, a power saving operation part 8 in the operation display part 7 and a manuscript detection part 9 in the reading part 10. That is, the machine is controlled so that the electric power is supplied only to parts and circuits which are necessary for resetting the waiting state (power saving state) in addition to the control unit 1 and, when the waiting state is reset the electric power is supplied to all parts and circuits which need power.

The message receiving modes are set and stored by the message receiving mode setting part 2 and include, for example, a facsimile mode and a telephone mode. The facsimile machine in the preferred embodiment can be used as a telephone as well as a facsimile machine by switching the mode of the facsimile machine. When the power is applied, the facsimile machine is automatically set, for example, to the facsimile mode, and the facsimile machine can be set to the telephone mode when a user gives an instruction via the operation display part 7. In the alternative, the facsimile machine can be automatically set to the facsimile mode during a certain time of the day and to the telephone mode during the remainder of the day. In either case, the mode is set by the message receiving mode setting part 2.

Figure 2:
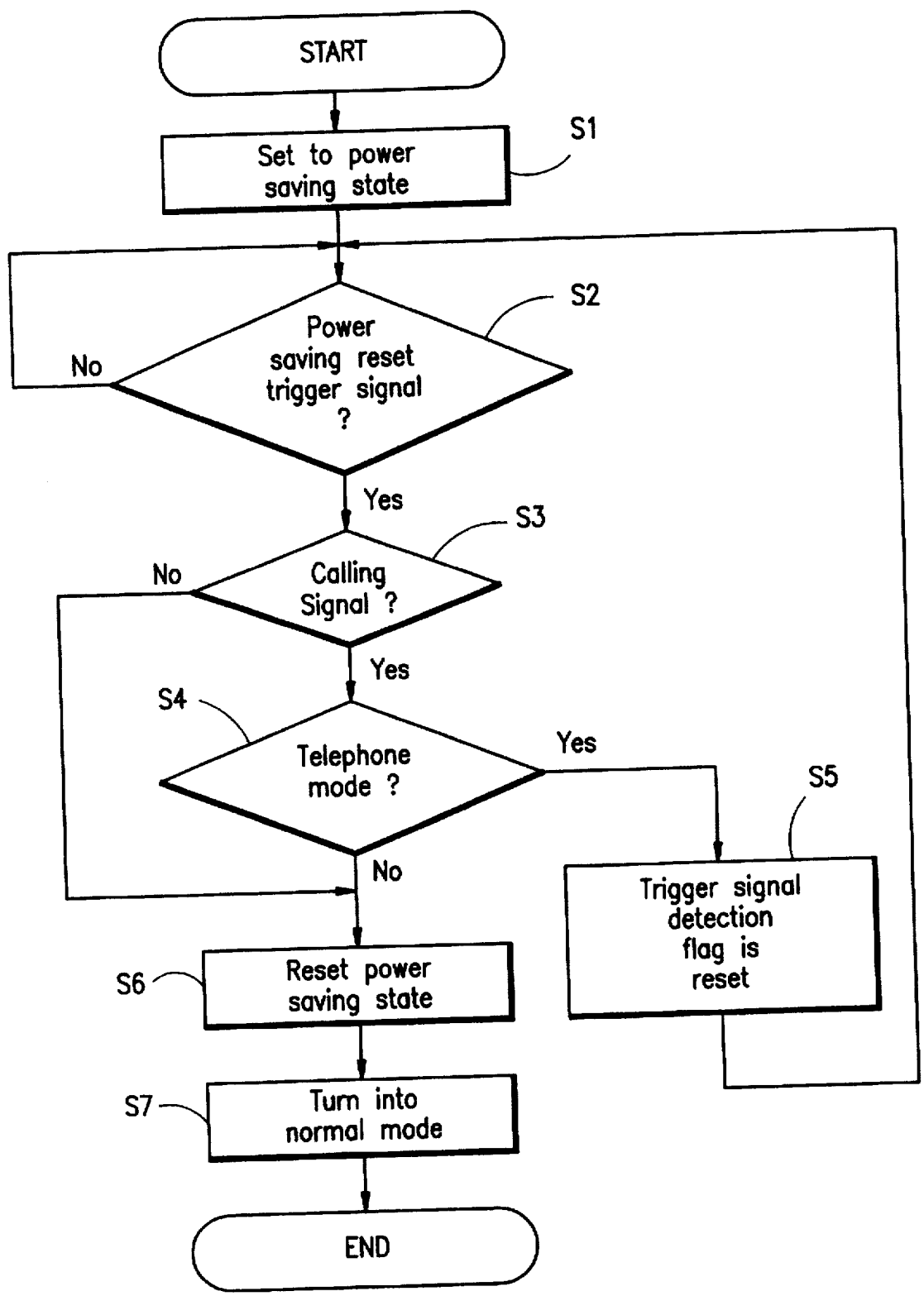
FIG. 2 is an operation flowchart showing an essential part of the facsimile machine equipped with a power saving function according to the first preferred embodiment of the present invention.

As shown in FIG. 2, the facsimile machine is typically initially set to the power saving state (S1). In this state, the existence or nonexistence of the power saving reset trigger signal is monitored (S2). The power saving reset trigger signal may be, for example, a signal sent upon receipt of a calling signal which is detected by the calling signal detection part 6 in the NCU 4 when the machine is set to a facsimile receiving mode, or a signal sent by the power saving operation part 8 upon detection of a signal generated by pressing a key of the control unit 1, or a signal sent by the manuscript detection part 9 of the reading part 10 upon detection of the placement of a manuscript at a location where it can be scanned. Upon detecting any one of these power saving reset trigger signals in the received signals, the power saving control unit 3 further determines whether or not the signal is generated in response to a calling signal (S3).

As a consequence, when the signal is not a calling signal, the power saving control unit 3 connects the power source switching part 14 which has been off and resets the power saving state (S6). On the other hand, when the signal is judged to be a calling signal at step S3, a message receiving mode, i.e. either facsimile or telephone, which is memorized in the message receiving mode setting part 2 in the control unit 1 is checked by the power saving control unit 3. If the set message receiving mode is not the telephone mode (S4), that is, it is the facsimile mode, the power saving state is reset as described above (S6).

On the other hand, if the set message receiving mode is the telephone mode (S4), a trigger signal detection flag which is set in RAM in the control unit 1 is reset (S5), the power saving state is continued, and the monitoring for a power saving reset trigger signal is again performed (S2). That is, when the facsimile machine is set to the telephone mode, the received calling signal is not judged to be a power saving state reset signal.

When the power saving state is reset (S6), power is supplied by the power switching part 14 to the non-powered circuits via power line 20 (FIG. 1). At this point the machine moves to a normal state (S7) and facsimile sending and receiving operations, or image forming such as a copying operation is performed. Then, when the execution of such processing is completed, a completion notice is given to the power saving control unit 3 at the end of each execution program, and the power saving control unit 3 communicates with the power switching part 14 which removes the power from the power line 20 and returns the machine to the power saving state (S1) again.

Figure 3:
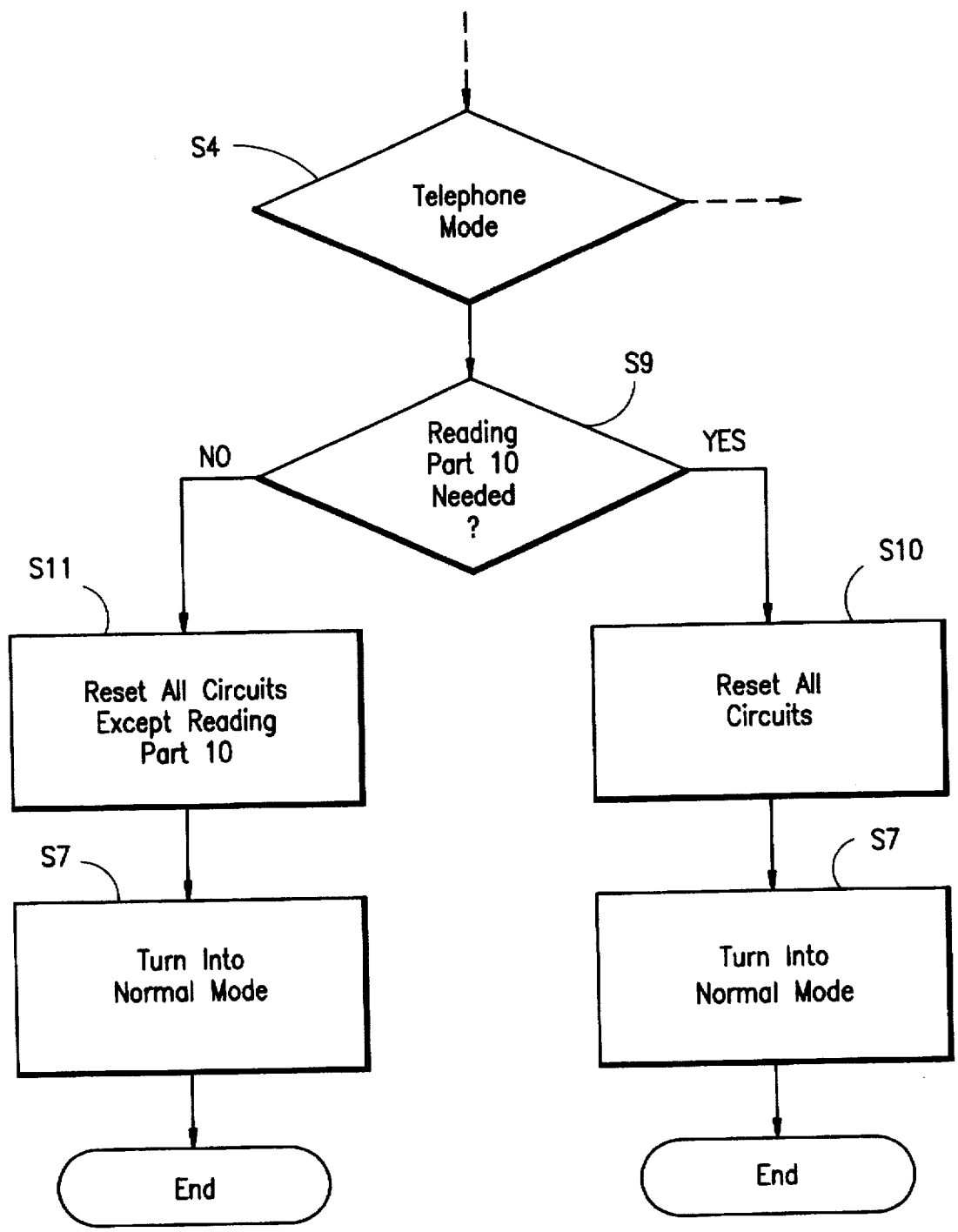
FIG. 3 is an operation flowchart showing an essential part of the facsimile machine equipped with a power saving function according to a second embodiment of the present invention.

FIG. 3 shows a second embodiment of the present invention. Steps S1-S5 are identical to like steps described in FIG. 2. However, after it is determined that the message receiving mode is not the telephone mode (S4), the machine determines whether the reading part 10 (scanner) is needed (S9) by detecting the presence of an image at the manuscript detection part 9. If it is, then all circuits are reset (S10) and the machine is placed in a normal mode (S7). If the reading part 10 is not needed, all circuits but the reading part 10 circuit are reset (S11) and the machine is placed in a normal made (S7). In either case, when the execution of the processing is completed, a completion notice is given to the power saving control unit 3 at the end of each execution program, and the power saving control unit 3 communicates with the power switching part 14 which reroutes the power from the power line 20 and returns the machine to the power saving state (S1) again.

Figure 4:
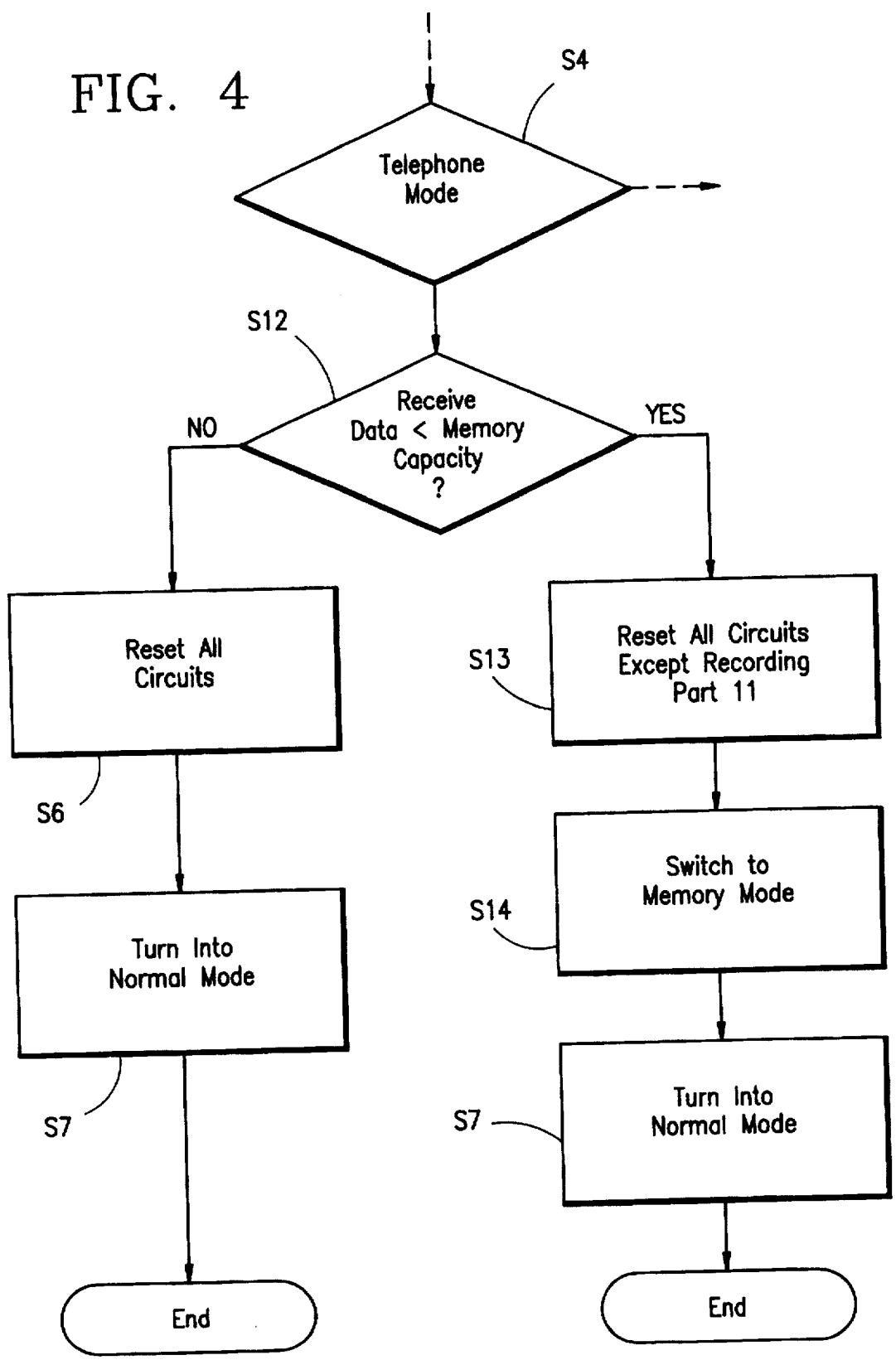
FIG. 4 is an operation flowchart showing an essential part of the facsimile machine equipped with a power saving function according to a third embodiment of the present invention.

FIG. 4 shows a third embodiment of the present invention. Steps S1-S5 are identical to like steps described in FIG. 2. However, after it is determined that the message receiving mode is not the telephone mode (S4), the facsimile machine determines if the amount of data to be received is less than the available capacity of the image memory in the control unit 1 (S12). If it is, then all circuits except the recording part 11 are reset (S13) and the machine is switched to a memory mode (S14). In this mode, the data will not be printed until the capacity of the memory is exhausted. However, if at step S12 the receive data is equal to or greater than the available capacity of the memory in control unit 1, than all circuits, including the recording part 11, are reset. In either case, when the execution of the processing is completed, a completion notice is given to the power saving control unit 3 at the end of each execution program, and the power saving control unit 3 communicates with the power switching part 14 which reroutes the power from the power line 20 and returns the machine to the power saving state (S1) again.

Figure 5:
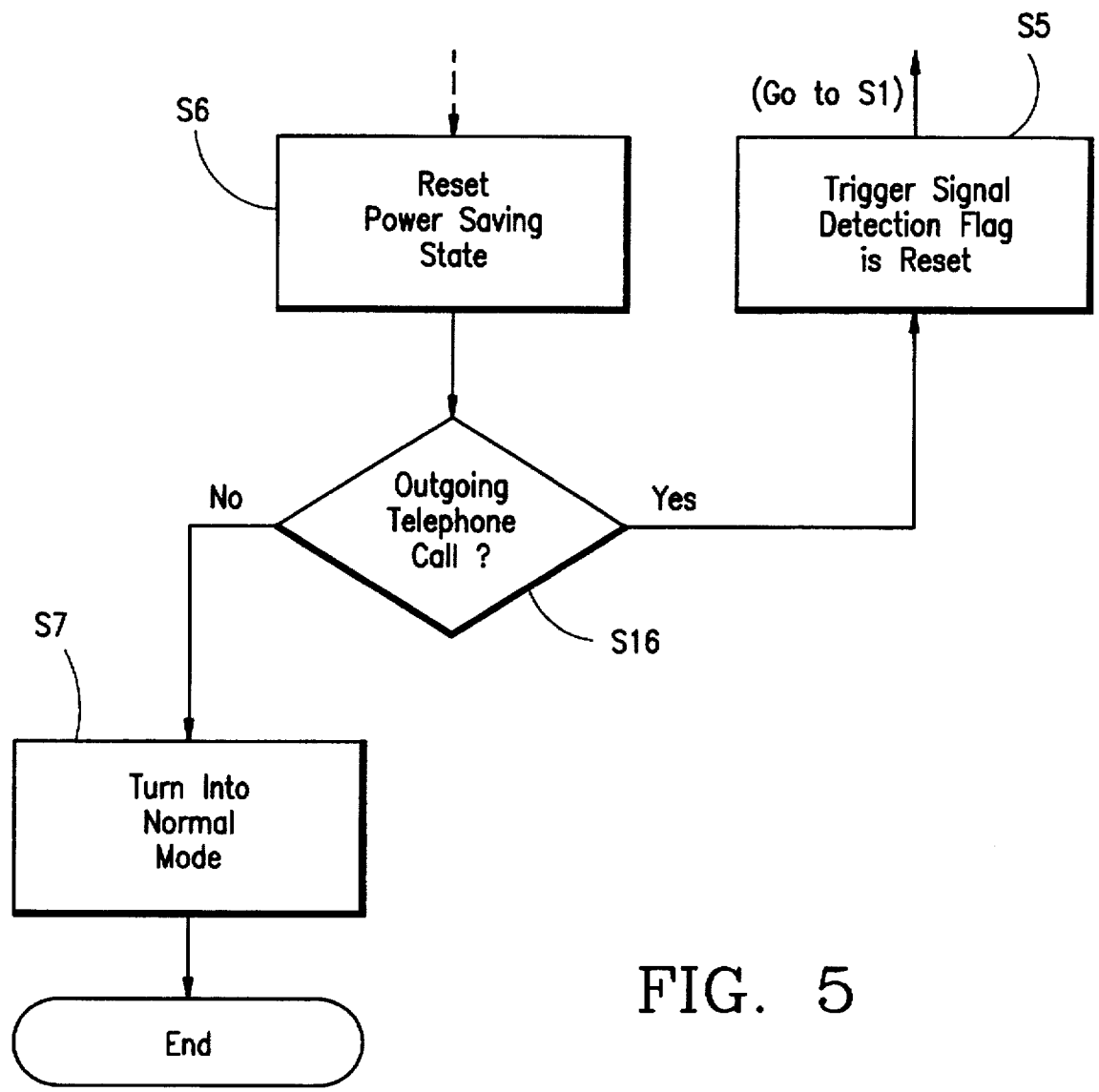
FIG. 5 is an operation flowchart showing an essential part of the facsimile machine equipped with a power saving function according to a fourth embodiment of the present invention.

FIG. 5 shows a third embodiment of the present invention. Steps S1-S6 are identical to like steps described in FIG. 2. However, at step S3, if it was determined that the reset signal generated is not a calling signal, the facsimile machine then determines whether the reset signal is the result of an outgoing telephone call at step (S16). If it is, the machine resets the trigger signal detection flag (S5) and returns to step S1 and remains in the power saving state. If the signal is not an outgoing telephone call the machine moves to the normal fully powered state (S7).

As described above, in accordance with the present invention, when receiving a calling signal from a telephone line, it is possible to control the facsimile machine so that the power saving state is reset when the facsimile machine is in the facsimile mode and is not reset when the facsimile machine is in the telephone mode. Consequently, since the facsimile machine does not reset the power saving state with the calling signal when in the telephone mode, power is not supplied to parts, such as an exposure lamp and heating parts which are required for image formation and use a large amount of power, and thereby an increase in unnecessary power consumption is prevented and the power saving effect can be improved.

In addition, since the facsimile machine is not operated by an unnecessary application of the power, the aging of the machine, especially the exposure lamp and heating parts, is reduced, so that the life of the machine can be extended.

While exemplary preferred embodiments of the invention have been described and illustrated in connection with the drawings the invention is not limited as described or illustrated but is only limited by the scope of the appended claims.

What is claimed is:

1. A facsimile machine having a power saving function while in a waiting state, said facsimile machine comprising:
    a message mode setting device for setting one of a plurality of possible message receiving modes, one of said plurality of possible message receiving modes being a facsimile mode and another of said possible message receiving modes being a telephone mode; and
    a power saving control unit for determining whether or not a predetermined signal, defined by a message receiving mode set by said mode setting device, is detected as a power saving reset signal, and if said predetermined signal is detected, for switching said facsimile machine from a power saving state, in which only select portions of said facsimile machine receive power, to at least one other state in which power is supplied to portions of said facsimile machine in addition to said select portions.

2. The facsimile machine according to claim 1, wherein said predetermined signal for said facsimile mode is a calling signal, said power saving control unit operating to determine that said calling signal is a power saving reset signal when the set message receiving mode is said facsimile mode and to determine that said calling signal is not a power saving reset signal when the set message receiving mode is said telephone mode.

3. The facsimile machine according to claim 2, wherein said at least one other state is a normal state in which power is supplied to all portions of said facsimile machine.

4. The facsimile machine according to claim 2, further comprising a reading device for reading an image document, wherein said at least one other state includes a normal state in which power is supplied to all portions of said facsimile machine, and a readerless state in which power is supplied to all portions of said facsimile machine except for said reading device.

5. The facsimile machine according to claim 4, wherein said power saving control unit determines whether said calling signal requires use of said reading device, and switches said facsimile machine from said power saving state to said readerless state if said reading device is not required, and from said power saving state to said normal state if said reading device is required.

6. The facsimile machine according to claim 2, further comprising a recording part for recording a facsimile image and a memory for storing facsimile data, wherein said at least one other state is a normal state in which power is supplied to all portions of said facsimile machine, and a recordingless state in which power is supplied to all portions of said facsimile machine except for said recording part.

7. The facsimile machine according to claim 6, wherein said power saving control unit determines whether data received by said facsimile machine is less than the remaining capacity of said memory, and switches said facsimile machine from said power saving state to said recordingless state if said data is less than the remaining capacity of said memory and from said power saving state to said normal state if said data is greater than the remaining capacity of said memory.

8. The facsimile machine according to claim 1, wherein one of said plurality of possible message receiving modes is a facsimile mode and another of said possible message receiving modes is a telephone mode, said power saving control unit operating to determine whether said predetermined signal is generated as a result of an outgoing telephone call, and, if it is, having the machine remain in said power saving state, otherwise having the machine switch to said at least one other state.

* * * * *